United States Patent
Vogel, III et al.

(10) Patent No.: US 7,733,803 B2
(45) Date of Patent: Jun. 8, 2010

(54) SYSTEMS AND METHODS FOR MODIFYING NETWORK MAP ATTRIBUTES

(75) Inventors: William A. Vogel, III, Baltimore, MD (US); Dina L. Bruzek, Dayton, MD (US)

(73) Assignee: Sourcefire, Inc., Columbia, MD (US)

( * ) Notice: Subject to any disclaimer, the term of this patent is extended or adjusted under 35 U.S.C. 154(b) by 596 days.

(21) Appl. No.: 11/272,034

(22) Filed: Nov. 14, 2005

(65) Prior Publication Data
US 2008/0198856 A1    Aug. 21, 2008

(51) Int. Cl.
*H04L 12/28* (2006.01)
*G06F 7/04* (2006.01)
*G06F 12/14* (2006.01)
*G06F 12/16* (2006.01)
*G06F 17/30* (2006.01)
*G08B 23/00* (2006.01)
*H04N 7/16* (2006.01)
*G06F 15/173* (2006.01)

(52) U.S. Cl. .............. 370/254; 370/255; 370/256; 370/257; 709/223; 709/224; 709/225; 709/226; 726/25

(58) Field of Classification Search ............. 370/254, 370/255, 256, 257; 709/223, 224; 726/25
See application file for complete search history.

(56) References Cited

U.S. PATENT DOCUMENTS

| | | | |
|---|---|---|---|
| 4,550,436 A | 10/1985 | Freeman | |
| 4,570,157 A | 2/1986 | Kodaira | |
| 4,857,912 A | 8/1989 | Everett et al. | |
| 4,912,748 A | 3/1990 | Horii et al. | |
| 4,985,863 A | 1/1991 | Fujisawa et al. | |
| 5,193,192 A | 3/1993 | Seberger | |
| 5,222,081 A | 6/1993 | Lewis et al. | |
| 5,404,488 A | 4/1995 | Kerrigan et al. | |
| 5,430,842 A | 7/1995 | Thompson et al. | |
| 5,459,841 A | 10/1995 | Flora-Holmquist et al. | |
| 5,497,463 A | 3/1996 | Stein et al. | |
| 5,604,910 A | 2/1997 | Kojima et al. | |
| 5,796,942 A | 8/1998 | Esbensen | |
| 5,870,554 A | 2/1999 | Grossman et al. | |
| 5,901,307 A | 5/1999 | Potter et al. ........... 712/240 |
| 5,917,821 A | 6/1999 | Gobuyan et al. | |
| 5,919,257 A | 7/1999 | Trostle | |
| 5,963,942 A | 10/1999 | Igata | |

(Continued)

OTHER PUBLICATIONS

Renaud Deraison, Jay Beale, Haroon Meer, Roelof Temmingh and Cherl Van Der Walt, Nessus Network Auditing, Sungress Publishing, Jul. 20, 2004, pp. 1-13.*

(Continued)

*Primary Examiner*—Daniel J Ryman
*Assistant Examiner*—Christopher Crutchfield
(74) *Attorney, Agent, or Firm*—Posz Law Group, PLC

(57) ABSTRACT

The disclosed systems and methods provide a user interface for modifying host configuration data that has been automatically and passively determined and for adding or modifying other parameters associated with a host. A host data table can store various parameters descriptive of a host including the applicability of specific vulnerabilities. If it is determined that one or more hosts should not be identified as associated with a specific vulnerability, a graphical user interface can be used to modify the vulnerability parameter.

7 Claims, 17 Drawing Sheets

U.S. PATENT DOCUMENTS

| | | | |
|---|---|---|---|
| 5,987,473 | A | 11/1999 | Jorgensen |
| 5,995,963 | A | 11/1999 | Nanba et al. |
| 5,999,937 | A | 12/1999 | Ellard |
| 6,002,427 | A | 12/1999 | Kipust |
| 6,141,686 | A | 10/2000 | Jackowski et al. |
| 6,199,181 | B1 | 3/2001 | Rechef et al. |
| 6,219,786 | B1 | 4/2001 | Cunningham et al. |
| 6,320,848 | B1 | 11/2001 | Edwards et al. |
| 6,321,338 | B1 | 11/2001 | Porras et al. |
| 6,324,656 | B1 | 11/2001 | Gleichauf et al. |
| 6,334,121 | B1 | 12/2001 | Primeaux et al. |
| 6,343,362 | B1 | 1/2002 | Ptacek et al. |
| 6,393,474 | B1 | 5/2002 | Eichert et al. |
| 6,415,321 | B1 | 7/2002 | Gleichauf et al. |
| 6,477,648 | B1 | 11/2002 | Schell et al. |
| 6,487,666 | B1 | 11/2002 | Shanklin et al. |
| 6,499,107 | B1 | 12/2002 | Gleichauf et al. |
| 6,539,381 | B1 | 3/2003 | Prasad et al. |
| 6,587,876 | B1 | 7/2003 | Mahon et al. |
| 6,590,885 | B1 | 7/2003 | Jorgensen |
| 6,678,734 | B1 | 1/2004 | Haatainen et al. |
| 6,678,824 | B1 | 1/2004 | Cannon et al. |
| 6,711,127 | B1 | 3/2004 | Gorman et al. |
| 6,754,826 | B1 | 6/2004 | Challenger et al. |
| 6,766,320 | B1 | 7/2004 | Wang et al. |
| 6,772,196 | B1 | 8/2004 | Kirsch et al. |
| 6,789,202 | B1 | 9/2004 | Ko et al. |
| 6,851,061 | B1 | 2/2005 | Holland et al. |
| 6,957,348 | B1 | 10/2005 | Flowers et al. |
| 6,983,323 | B2 | 1/2006 | Cantrell et al. |
| 6,999,998 | B2 | 2/2006 | Russell |
| 7,032,114 | B1 | 4/2006 | Moran ............ 713/187 |
| 7,058,821 | B1 | 6/2006 | Parekh et al. |
| 7,065,657 | B1 | 6/2006 | Moran |
| 7,073,198 | B1 | 7/2006 | Flowers et al. ............. 726/25 |
| 7,076,803 | B2 | 7/2006 | Bruton et al. |
| 7,096,503 | B1 | 8/2006 | Magdych et al. |
| 7,113,789 | B1 * | 9/2006 | Boehmke ............. 455/446 |
| 7,133,916 | B2 | 11/2006 | Schunemann |
| 7,134,141 | B2 | 11/2006 | Crosbie et al. |
| 7,152,105 | B2 | 12/2006 | McClure et al. ............. 709/224 |
| 7,181,769 | B1 | 2/2007 | Keanini et al. |
| 7,257,630 | B2 | 8/2007 | Cole et al. ............. 709/224 |
| 7,305,708 | B2 | 12/2007 | Norton et al. |
| 7,310,688 | B1 | 12/2007 | Chin ............. 709/252 |
| 7,313,695 | B2 | 12/2007 | Norton et al. |
| 7,315,801 | B1 | 1/2008 | Dowd et al. |
| 7,317,693 | B1 | 1/2008 | Roesch et al. |
| 7,363,656 | B2 | 4/2008 | Weber et al. |
| 2001/0027485 | A1 | 10/2001 | Ogishi et al. |
| 2001/0034847 | A1 | 10/2001 | Gaul, Jr. |
| 2002/0035639 | A1 | 3/2002 | Xu |
| 2002/0066034 | A1 | 5/2002 | Schlossberg |
| 2002/0083344 | A1 | 6/2002 | Vairavan |
| 2002/0087716 | A1 | 7/2002 | Mustafa |
| 2002/0112185 | A1 | 8/2002 | Hodges |
| 2002/0123995 | A1 | 9/2002 | Shibuya |
| 2002/0165707 | A1 | 11/2002 | Call |
| 2003/0014662 | A1 | 1/2003 | Gupta et al. |
| 2003/0046388 | A1 | 3/2003 | Milliken |
| 2003/0065817 | A1 | 4/2003 | Benchetrit et al. |
| 2003/0083847 | A1 | 5/2003 | Schertz et al. |
| 2003/0093517 | A1 | 5/2003 | Tarquini et al. |
| 2003/0101353 | A1 | 5/2003 | Tarquini et al. ............. 713/200 |
| 2003/0140250 | A1 | 7/2003 | Taninaka et al. |
| 2003/0195874 | A1 | 10/2003 | Akaboshi |
| 2003/0212910 | A1 | 11/2003 | Rowland et al. |
| 2003/0229726 | A1 | 12/2003 | Daseke et al. |
| 2004/0015728 | A1 | 1/2004 | Cole et al. |
| 2004/0034773 | A1 | 2/2004 | Balabine et al. |
| 2004/0064726 | A1 | 4/2004 | Girouard |
| 2004/0073800 | A1 | 4/2004 | Shah et al. |
| 2004/0093582 | A1 | 5/2004 | Segura |
| 2004/0098618 | A1 | 5/2004 | Kim et al. |
| 2004/0123153 | A1 | 6/2004 | Wright et al. |
| 2004/0172234 | A1 | 9/2004 | Dapp et al. |
| 2004/0179477 | A1 | 9/2004 | Lincoln et al. |
| 2004/0193943 | A1 | 9/2004 | Angelino et al. |
| 2004/0221176 | A1 | 11/2004 | Cole |
| 2004/0268358 | A1 | 12/2004 | Darling et al. |
| 2005/0005169 | A1 | 1/2005 | Kelekar |
| 2005/0044422 | A1 | 2/2005 | Cantrell et al. |
| 2005/0108393 | A1 | 5/2005 | Banerjee et al. |
| 2005/0113941 | A1 | 5/2005 | Ii et al. |
| 2005/0114700 | A1 | 5/2005 | Barrie et al. |
| 2005/0160095 | A1 | 7/2005 | Dick et al. |
| 2005/0172019 | A1 | 8/2005 | Williamson et al. |
| 2005/0188079 | A1 * | 8/2005 | Motsinger et al. ............. 709/224 |
| 2005/0229255 | A1 | 10/2005 | Gula et al. |
| 2005/0240604 | A1 | 10/2005 | Corl, Jr. et al. |
| 2005/0251500 | A1 | 11/2005 | Vahalia et al. |
| 2005/0268331 | A1 | 12/2005 | Le et al. |
| 2005/0268332 | A1 | 12/2005 | Le et al. |
| 2005/0273857 | A1 | 12/2005 | Freund |
| 2006/0174337 | A1 | 8/2006 | Bernoth |
| 2006/0265748 | A1 | 11/2006 | Potok |
| 2006/0294588 | A1 | 12/2006 | Lahann et al. |
| 2007/0192863 | A1 | 8/2007 | Kapoor et al. |
| 2007/0288579 | A1 | 12/2007 | Schunemann |
| 2008/0168561 | A1 | 7/2008 | Durie et al. |
| 2009/0028147 | A1 | 1/2009 | Russell |

OTHER PUBLICATIONS

Renaud Deraison, Ron Gula and Todd Hayton, Passive Vulnerability Scanning: Introduction to NeVO, Tenable Network Security, May 30, 2004, pp. 1-13.*

International Preliminary Report on Patentability dated May 22, 2008 in corresponding PCT application No. PCT/US2006/043800.

Office Action issued on Feb. 5, 2008 in connection with the related U.S. Appl. No. 10/843,375.

Spitzner, Lance; Passive Fingerprinting, May 3, 2003; Focus on Intrusion Detection; pp. 1-4; obtained from http://www.ctillhq.com/pdfdb/000183/data.pdf.

Lyon, Gordon; Remote OS detection via TCP/IP Stack Fingerprinting, Jun. 30, 2002; pp. 1-12; obtained from: http://web.archive.org/web/20021017063625/www.insecure.org/nmap/nmap-fingerprinting-article.html.

U.S. Appl. No. 10/843,353, filed May 2004, Roesch et al., System and Method for Determining Characteristics of a Network and Analyzing Vulnerabilities.

U.S. Appl. No. 10/843,373, filed May 2004, Roesch et al., Systems and Methods for Identifying the Services of a Network.

U.S. Appl. No. 10/843,374, filed May 2004, Roesch et al., System and Methods for Determining Characteristics of a Network Based on Flow Analysis.

U.S. Appl. No. 10/843,375, filed May 2004, Roesch et al., Systems and Methods for Determining Characteristics of a Network and Assessing Confidence.

U.S. Appl. No. 10/843,398, filed May 2004, Roesch et al., Systems and Methods for Determining Characteristics of a Network.

U.S. Appl. No. 10/843,459, filed May 2004, Roesch et al., Systems and Methods for Determining Characteristics of a Network and Enforcing Policy.

U.S. Appl. No. 10/898,220, filed Jul. 2004, Norton et al., Methods and Systems for Multi-Pattern Searching.

U.S. Appl. No. 10/951,796, filed Sep. 2004, Roelker et al., Intrusion Detection Strategies for Hypertext Transport Protocol.

U.S. Appl. No. 11/272,033, filed Nov. 2005, Dempster et al., Systems and Methods for Identifying the Client Applications of a Network.

U.S. Appl. No. 11/272,035, filed Nov. 2005, Gustafson et al., Intrusion Event Correlation with Network Discovery Information.

U.S. Appl. No. 11/493,934, filed Jul. 2006, Roesch et al., Device, System and Method for Analysis of Fragments in a Fragment Train.

U.S. Appl. No. 11/501,776, filed Aug. 2006, Roesch et al., Device System and Method for Analysis of Segments in a Transmission Control Protocol (TCP) Session.
U.S. Appl. No. 11/711,876, filed Feb. 2007, Sturges et al., Device, System and Method for Timestamp Analysis of Segments in a Transmission Control Protocol (TCP) Session.
U.S. Appl. No. 11/785,609, filed Apr. 2007, Norton et al., Methods and Systems for Multi-Pattern Searching.
U.S. Appl. No. 11/905,980, filed Oct. 2007, Roesch, Device, System and Method for Use of Micro-Policies in Intrusion Detection/Prevention.
U.S. Appl. No. 12/010,900, filed Jan. 2008, Norton et al., Methods and Systems for Multi-Pattern Searching.
U.S. Appl. No. 12/149,196, filed Apr. 2008, Rittermann, Real-Time User Awareness for a Computer Network.
U.S. Appl. No. 12/230,338, filed Aug. 2008, Sturges et al., Speed and Memory Optimization of Intrusion Detection System (IDS) and Intrusion Prevention System (IPS) Rule Processing.
Aho et al., "Efficient String Matching: An Aid to Bibliographic Search," *Communications from the ACM* (Jun. 1975), vol. 18, No. 6, pp. 333-340.
Tarjan, et al., "Storing a Sparse Table," Communications of the ACM (Nov. 1979), vol. 2, No. 11, pp. 606-620.
T. Ptacek, et al., "Insertion, Evasion, and Denial of Service: Eluding Network Intrusion Detection", Jan. 1998, pp. 1-63.
N. Chase, "Active Server pp. 3.0 from Scratch" (Dec. 1999), Searching for products section, 13 pp.
B. Krishnamurthy, "Web Protocols and Practice," (May 1, 2001), pp. 518-520.
U. Shankar and V. Paxson, *Active Mapping: Resisting NIDS Evasion Without Alerting Traffic*, Proc. IEEE Symposium on Security and Privacy. May 2003, pp. 1-18.
D. Roelker, "HTTPS IDS Evasions Revisited" (Aug. 1, 2003) [online] (retrieved on Nov. 9, 2006). Retrieved from the Internet <URL: http://docs.idsresearch.org/http_ids_evasions.pdf>.
Norton et al., "Multi-Patten Search Engine Aho-Corasick State Machine" (Mar. 17, 2004), Version 2.0, 36 pp.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.
Norton et al., "Sourcefire Optimizing Pattern Matching for Intrusion Detection" (Sep. 2004), 14 pp.
J. Novak, "Target-Based Fragmentation Reassembly" (Apr. 2005), Revision 2.0, pp. 1-32.
S.Siddharth, "Evading NIDS, revisited" (Dec. 12, 2005).
"Snort™ Users Manual 2.6.0," *The Snort Project* (May 23, 2006), pp. 1-126.
"Toupper()—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-modelAUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
Office Action issued by the U.S. Patent Office on Nov. 21, 2007 in connection with related U.S. Appl. No. 10/843,398.

European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.
International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
International Search Report and Written Opinion of the International Searching Authority dated Oct. 9, 2007 in corresponding patent application No. PCT/US06/43800.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.
Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Jan. 16, 2009 in connection with related U.S. Appl. No. 10/843,353.

Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with related U.S. Appl. No. 10/843,459.
International Preliminary Report on Patentability and Written Opinion of the International Searching Authority mailed on Mar. 3, 2009 in connection with PCT application No. PCT/US05/025584, which corresponds to related U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
Office Action issued by the U.S. Patent Office on Jul. 6, 2009 in connection with related U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with related U.S. Appl. No. 10/843,459.
European Search Report issued by the European Patent Office on Oct. 12, 2009 in connection with European patent application No. 05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
Full Band and Matrix Algorithms (Jun. 9, 2004), http://web.archive.org/web20040109154658/http://www.netlib.org/utk/Isi/pcwLSI/text/node150.html.
International Preliminary Report on Patentability mailed on Apr. 7, 2009 in connection with PCT application No. PCT/US07/021351, which corresponds to U.S. Appl. No. 11/905/980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
R. Gula, "Passive Vulnerability Detection. *Techniques to passively find network security vulnerabilities,*" Sep. 9, 1999 (5 pp.).
R.P. Lippmann et al., "Passive Operating System Identification from TCP/IP Packet Headers," *Proceedings Workshop on Data Mining for Computer Security* (*DMSEC*), Nov. 2003 (10 pp.).
N. Brownlee, et al., "Methodology for Passive Analysis of a University Internet Link," *PAM2001 Passive and Active Measurement Workshop*, Apr. 2001 (7 pp.).
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Advisory Action issued by the U.S. Patent Office on Feb. 24, 2010 in connection with related U.S. Appl. No. 11/272,035.
Office Action issued by the U.S. Patent Office on Mar. 22, 2010 in connection with related U.S. Appl. No. 11/493,934.
Notice of Allowance issued by the U.S. Patent Office on Mar. 5, 2010 in connection with related U.S. Appl. No. 11/785,609.
Final Office Action issued by the U.S. Patent Office on Mar. 17, 2010 in connection with related U.S. Appl. No. 10/843,374.
Office Action issued by the U.S. Patent Office on Mar. 16, 2010 in connection with related U.S. Appl. No. 11/272,035.
International Search Report and Written Opinion of the International Searching Authority issued on Mar. 16, 2010 in connection with PCT application no. PCT/US09/59965, which corresponds to U.S. Appl. No. 12/575,612.

* cited by examiner

| User-Defined Host Attributes | | | (Create) |
|---|---|---|---|
| Name | Type | Auto-Assign | |
| Summary | Text | ☐ | Edit Delete |
| Location | List | ☑ | Edit Delete |
| Room Number | Integer | ☐ | Edit Delete |

FIG. 3

|  | New Host Attribute |
|---|---|
| Name | Summary |
| Type | text ▼ |

Save

Return to Attribute List

FIG. 4

|      | New Host Attribute |
|------|--------------------|
| Name | Room Number |
| Type | Integer ▼ |
| Min  | 1 |
| Max  | 101 |

Save

Return to Attribute List

| | Host Attribute | |
|---|---|---|
| Name | Room Number | |
| Type | Integer | |
| Min | 1 | |
| Max | 101 | |

Save

Return to Attribute List

FIG. 7

| | Host: 10.4.12.16 (edit) | | | | |
|---|---|---|---|---|---|
| Hostname | habu.sfeng.sourcefire.com | | | | |
| NetBIOS Name | HABU | | | | |
| Hops from sensor | 0 | | | | |
| Operating System | Apple Mac OS X 10.3 | | | | |
| OS Confidence | 100 | | | | |
| MAC Addresses (TTL) | 00:03:93:8C:3C:02 (255) 00:02:FD:B2:17:42 (127) | | | | |
| Host Type | Host | | | | |
| Last Seen | 2004-12-20 10:11:28 | | | | |
| Events | View | | | | |
| Host Criticality | Low | | | | |
| Notes | The notes about this host | | | | |
| Summary | Some text that summarizes this host. | | | | |
| Location | Tokyo | | | | |
| Room Number | 22 | | | | |

Host Protocols: 7 ▼

| | | Services: 3 ▲ | | | |
|---|---|---|---|---|---|
| | Protocol | Port | Service | Version | Last Used |
| View Flow | tcp | 22 | ssh | OpenSSH 3.6.1p1+CAN-2004-0175 | 2004-12-16 20:54:28 ✗ |
| View Flow | udp | 138 | netbios-dgm | | 2004-12-20 09:59:50 ✗ |
| View Flow | tcp | 139 | netbios-ssn | | 2004-12-20 09:42:11 ✗ |

Client Applications: 2 ▼

Vulnerabilities: 48 (edit) ▼

| | | Vulnerabilities | | |
|---|---|---|---|---|
| | | Name | Service | Port |
| ☐ | View | RSync Daemon Mode Undisclosed Remote Heap Overflow Vulnerability | | |
| ☐ | View | OpenSSL Denial of Service Vulnerabilities | | |
| ☐ | View | Multiple Apple Mac OS X Local And Remote Vulnerabilities | | |
| ☐ | View | Apple Mac OS X Mail Undisclosed HTML Handling Vulnerability | | |
| ☐ | View | TCPDump Malformed RADIUS Packet Denial Of Service Vulnerability | | |
| ☐ | View | Eric S. Raymond Fetchmail Unspecified Denial of Service Vulnerability | | |
| ☐ | View | Apple Mac OS X AppleFileServer Remote Buffer Overflow Vulnerability | | |
| ☐ | View | Multiple Apple Mac OS X Operating System Component Vulnerabilities | | |
| ☐ | View | Racoon IKE Daemon Unauthorized X.509 Certificate Connection Vulnerability | | |
| ☐ | View | Apache Connection Blocking Denial Of Service Vulnerability | | |
| ☐ | View | Apache Mod_SSL HTTP Request Remote Denial Of Service Vulnerability | | |
| ☐ | View | Apple MacOS X DHCP Response Root Compromise Vulnerability | | |
| ☐ | View | TCPDump ISAKMP Decoding Routines Denial Of Service Vulnerability | | |
| ☐ | View | Apple Mac OS X 10.3 Unspecified Apple Quicktime Java Vulnerability | | |
| ☐ | View | Apple MacOS X ASN.1 Decoding Unspecified Remote Denial Of Service Vulnerability | | |
| ☐ | View | Apple Mac OS X Jaguar/Panther Multiple Vulnerabilities | | |
| ☐ | View | TCPDump ISAKMP Decoding Routines Multiple Remote Buffer Overflow Vulnerabilities | | |
| ☐ | View | Apple Safari Web Browser Null Character Cookie Stealing Vulnerability | | |
| ☐ | View | Libxml2 Remote URI Parsing Buffer Overrun Vulnerability | | |
| ☐ | View | Apache Error Log Escape Sequence Injection Vulnerability | | |
| | | Non-applicable | | |
| | | Name | Service | Port |
| ☐ | View | KAME Racoon Malformed ISAKMP Packet Denial of Service Vulnerability | | |
| ☐ | View | Apple Mac OS X Apple Filing Protocol Client Multiple Vulnerabilities | | |
| ☐ | View | Apple Mac OS X Server Administration Service Undisclosed Remote Buffer Overflow Vulnerability | | |

Submit

FIG. 12

| Search Information | | |
|---|---|---|
| Name | | Search 1, My Search |
| Constraint | | Example |
| IP Address | | 192.168.1.1/24,!192.168.1.3 |
| Criticality | | High, None |
| VLAN ID | | 10 |
| Hops | | 32, < 5, > 1, <> 1 |
| Last Seen | | > 2003-07-16 13:00:31, < today at 4:30pm |
| OS Vendor | | Microsoft |
| OS Name | | Windows, unknown |
| OS Version | | 95, unknown |
| Confidence | | > 50 |
| Search | Save As New Search | ☑ Save As Private |

Note: If a search name is not specified, an automatically generated name will be used.

FIG. 13

|  | Host 10.1.6.14 |
|---|---|
| Hostname | sfns2000.research.sourcefire.com |
| Hops from sensor | 2 |
| Operating System | Linux Linux 2.4 or 2.6 |
| MAC Address (TTL) | 00:0F:24:2A:50:30 (62) |
| Host Type | Host |
| Confidence | 50 |
| Criticality | [None ▼] |
| Events | View |
| Notes (edit) | |

FIG. 16

SYSTEMS AND METHODS FOR MODIFYING NETWORK MAP ATTRIBUTES

FIELD OF THE INVENTION

Embodiments of the present invention relate to systems and methods for determining the characteristics of a computer network. More particularly, embodiments of the present invention relate to systems and methods for automatically and passively determining a host configuration of a computer network and providing a user interface for modifying the host configuration data.

BACKGROUND

Computers and computer networks connecting such computers are vital components of modern society. Unfortunately, such computer networks are susceptible to attacks from internal and external hostile sources. Intrusion detection systems (IDSs) are used to prevent such attacks. Conventional IDSs operate by analyzing network traffic in terms of the traffic itself. They do not, however, consider the end points of that traffic. End points refer to the originators and recipients of message traffic. Such end points include, for example, clients and the servers. Analysis of end points can provide contextual information about the network such as host addresses and services. By not considering these end points, a vital piece of contextual information about the network is missed. Consequently, a substantial need exists for technologies that provide information about the end points of computer network traffic.

IDSs are less effective than they could be because they do not have contextual information about the computer network they are monitoring. For example, without contextual information, IDSs are susceptible to a computer network attack known as evasion. Evasion occurs when an attacker uses network endpoint information that the IDS does not have to evade detection by the IDS. A known method of evasion is insertion. Insertion can be used in networks having a routing infrastructure that handles packets of different sizes. For example, a routing link (router or some other device) may be attached to a network that supports a 1500 byte maximum size on one side of the device and 500 bytes on the other. If someone was trying to talk to a host on the other side of the device, the maximum packet size they could send is 500 bytes. This maximum is called the "Path MTU" (Maximum Transfer Unit). If an attacker knows this, they can transmit a large packet between two properly sized packets and get the IDS to accept the oversized packet, giving the IDS a bad model of the data that is actually arriving at the host.

Not only does the lack of contextual information make the IDS more susceptible to attack, but it also makes the IDS less efficient. One such inefficiency is that, without contextual information, the IDS may not be able to discern whether or not an attack can cause harm. Attacks can be directed to a particular service running on a target host. Without information about the services running on the target host, an IDS could mistakenly detect an attack even if that host is not running the targeted service. That is, the IDS would cause an alarm even though the attack would be harmless. Such an event is called a false positive. Large numbers of false positives can make it more difficult and expensive to locate genuine attacks that can harm a host on the network.

Some conventional techniques for providing contextual information to IDSs are known. One such technique is for a human to audit each host manually and gather all desired contextual information. This manual method has a number of disadvantages including that it is time consuming, prone to error, and makes maintenance more difficult. One reason for these drawbacks is that networks are dynamic in nature. Host computers in computer networks are added, removed, and reconfigured. If these changes are not meticulously documented, each computer on the network must be revisited periodically to insure that the contextual information is up to date.

Another conventional technique for providing contextual information to an IDS is an automatic discovery system. Conventional automatic discovery systems are active scanning systems that actively probe end hosts on a computer network and perform stimulus response tests on them to find and record vulnerabilities that exist on end hosts. Though not manual, active scanning systems also suffer from several problems. One problem is that active scanning can be destructive to the network. In testing for vulnerabilities, they can cause both routers and servers to malfunction or stop functioning. Another problem is that they may not provide information useful to an IDS because in many instances a one-to-one mapping does not exist between the information an active scanner provides and the information an IDS can use. Another problem is that active scanners only provide a snapshot of the network at the time when the scan is performed. This snapshot is problematic because a host may run a vulnerable service transiently. In such a case, the active scanning may be performed at a time when the vulnerable service is not running. As a result, the active scan would not cause an alarm despite the transient nature of the vulnerability.

While it is advantageous to automatically and passively determine a host configuration, there may be occasions when a passively determined map does not incorporate information that would be useful. For example, a certain version of a service may be known to have certain vulnerabilities while another version of the same service may not be vulnerable. In some cases, a patch may have been applied to a service running on a host thereby eliminating a known vulnerability. In cases such as these, it is advantageous to provide an interface by which a user can modify the data stored in the network map. It is a further advantage to allow a user to conveniently annotate network map data with a graphical user interface.

In view of the foregoing, it can be appreciated that a substantial need exists for systems and methods that can advantageously provide a user interface for modifying an automatically and passively determined host configuration of a computer network.

SUMMARY OF THE INVENTION

One embodiment of the invention includes a method for assigning a vulnerability parameter to a device on a network by defining a vulnerability parameter for an operating system or service, storing the vulnerability parameter in a host map associated with a network device, providing a graphical user interface for viewing and modifying the vulnerability parameter, and storing the modified vulnerability parameter in the host map associated with the service or operating system.

Another embodiment of the invention includes a method for automatically and passively determining the characteristics of a network by reading one or more packets transmitted on the network, identifying a network device on the network using the one or more packets, recording an identity of the network device in a host map record associated with the network device, providing a graphical user interface for receiving a parameter from a user, and recording the user parameter in the host map record associated with the network device.

Another embodiment of the invention is a system for assigning a vulnerability parameter to a device on a network including a computer-readable medium for storing a vulnerability parameter for an operating system or service in a host map associated with a network device, a display for displaying a graphical user interface for viewing and modifying the vulnerability parameter assigned to the service or operating system, and a computer-readable medium for storing the modified vulnerability parameter in the host map associated with the service or operating system.

Another embodiment of the invention is a system for automatically and passively determining the characteristics of a network including a receiver for receiving one or more packets transmitted on the network and identifying a network device on the network using the one or more packets, a computer-readable medium for storing an identity of the network device in a host map, a display for displaying a graphical user interface for receiving a parameter from a user, and a computer-readable medium for storing the user parameter in the host map associated with the identified network device.

BRIEF DESCRIPTION OF THE DRAWINGS

FIG. 3 illustrates an exemplary user interface for displaying user-defined host attributes.

FIG. 4 illustrates an exemplary user interface for adding and naming a new attribute and selecting its type.

FIG. 5 illustrates an exemplary user interface for defining an integer attribute with a range.

FIG. 6 illustrates an exemplary user interface for adding or selecting list items.

FIG. 7 illustrates an exemplary user interface for modifying an attribute in the attribute list.

FIG. 9 illustrates an exemplary user interface including collapsed subsections.

FIG. 10 illustrates an exemplary interface for editing attributes in a table view.

FIG. 12 illustrates an exemplary user interface for displaying "Invalid" or "Not Applicable" vulnerabilities.

FIG. 13 illustrates an exemplary interface for searching a criticality field.

FIG. 16 illustrates an exemplary interface for setting a criticality field.

DETAILED DESCRIPTION OF THE INVENTION

Figure 1:
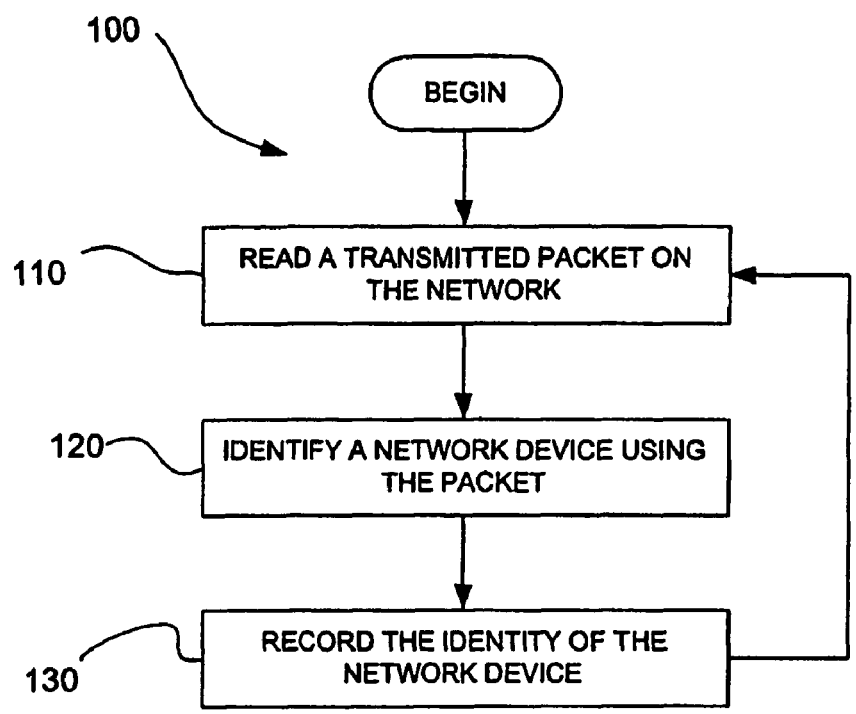
FIG. 1 illustrates an exemplary method for automatically and passively determining the characteristics of a network.

Embodiments of systems and methods for modifying a passively determined network characteristic database are described in this detailed description of the invention. In this detailed description, for purposes of explanation, numerous specific details are set forth to provide a thorough understanding of embodiments of the present invention. One skilled in the art can appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

The present invention is applicable to IDSs, such as those described in the co-pending U.S. patent application Ser. No. 10/793,887, filed Mar. 8, 2004, titled "Methods and Systems for Intrusion Detection," by Marc A. Norton and Daniel J. Roelker, which is herein incorporated by reference in its entirety. The present invention is also applicable to analysis of vulnerabilities, as described in the co-pending U.S. patent application Ser. No. 10/843,353, filed May 12, 2004, titled "Systems and Methods for Determining Characteristics of a Network and Analyzing Vulnerabilities," by Martin Roesch, William Andrew Vogel, III, and Matt Watchinski, which is herein incorporated by reference in its entirety.

Embodiments of the present invention can be applied to passively determined network maps or characteristic databases. These systems are passive because they examine packets moving across a network; they do not perform active scans. They are automatic because they require little or no human intervention. Such passive systems operate by performing functions including: (1) identifying each network device on a network, (2) identifying operating system and services running on each network device, (3) recording, in real-time, any changes occurring on the network, and (4) gathering this information in a format that can be used by a network reporting mechanism. Exemplary network reporting mechanisms include IDSs and network management systems (NMSs).

Network reporting mechanisms can examine packets moving across a network in real-time, for characteristic information about the network. One such type of characteristic information is information related to a network device, or host, on the network. One skilled in the art can appreciate that a network device is any device with a network connection. Network devices include but are not limited to computers, printers, switches, game machines, and routers.

In response to network traffic, the identity of the network device is recorded. The identity is stored as a data structure in a file or database, for example. If a packet identifies a network device that has previously been recorded, the current information and the previous information are compared and any changes are recorded. If no changes have been found, no new information is recorded. In either case, the next packet is read.

FIG. 1 is a flowchart showing an exemplary method 100 for automatically and passively determining the characteristics of a network in accordance with an embodiment of the present invention.

In step 110 of method 100, a packet transmitted on a network is read.

In step 120, a network device is identified using the packet. A network device includes but is not limited to a computer, a printer, and a router. One skilled in the art can appreciate that a network device can also be referred to as a host.

In step 130, the identity of the network device is recorded. The identity is stored as a data structure in a file or database, for example. If a packet identifies a network device that has previously been recorded, the current information and the previous information are compared and changes can be recorded. If no changes have been found, no new information is recorded. In either case, method 100 returns to step 110 to read the next packet.

Figure 2:
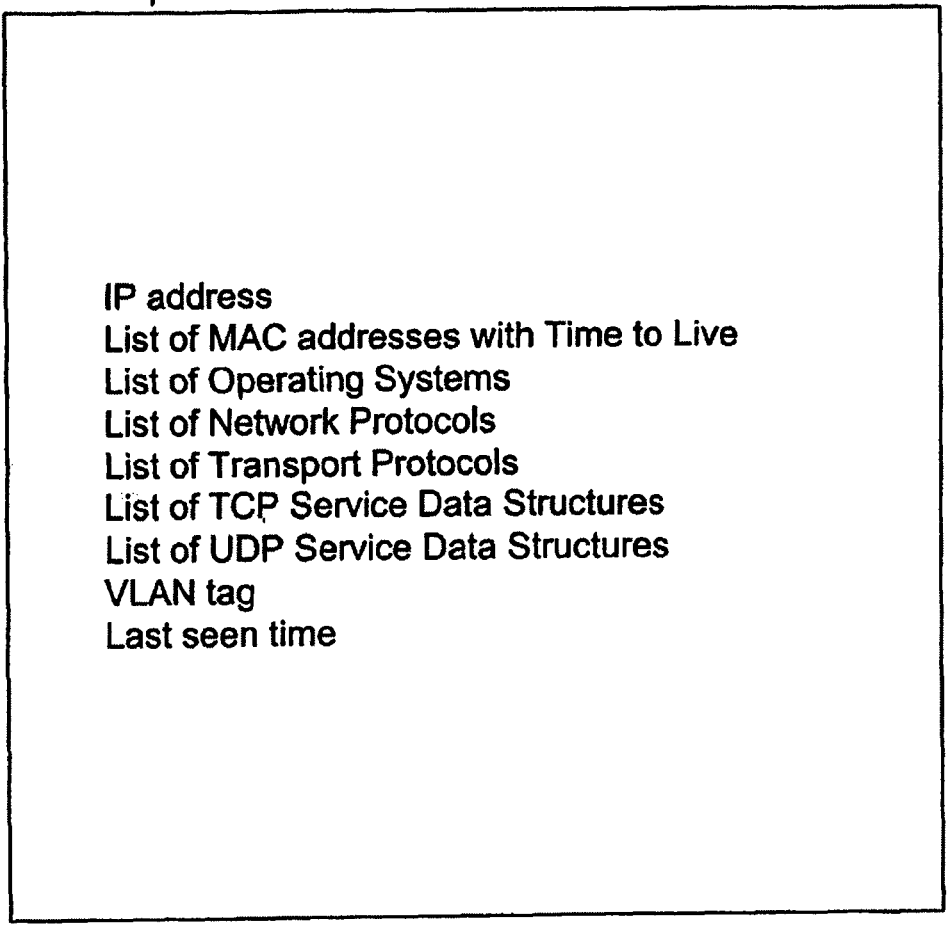
FIG. 2 illustrates an exemplary data structure for storing network device information or host information.

FIG. 2 is an exemplary data structure used to store network device information, or host information. This data structure is the host representative data structure. As non-limiting examples, the host information can includes the initiator Internet protocol (IP) address, a list of media access control (MAC) addresses with a time-to-live (TTL) parameter for each MAC address, a list of operating systems, a list of network protocols, a list of transport protocols, a list of transmission control protocol (TCP) service data structures, a list of user datagram protocol (UDP) service data structures, a virtual local area network (VLAN) tag, and a last seen time. The IP address, MAC address and TTL parameter of at least one network device on the network are typically included in each packet transmitted on the network. As a result, these pieces of host information are obtained by directly parsing the network and transport protocol fields of each packet.

Vulnerability Analysis

In some network monitoring systems, vulnerabilities are assigned to hosts discovered on a network. Vulnerabilities are known methods of maliciously gaining access to a host or host service, or maliciously attacking a host or host service. The vulnerabilities assigned to a host are derived from various sources and this information can be stored in the data structures discussed above for storing network device information. IDSs for example, can maintain vulnerability lists.

A list of potential vulnerabilities can be stored in a vulnerabilities database (VDB). When a host or host service is identified, one or more vulnerabilities from the VDB is mapped in real-time to the host or host service. These vulnerabilities can then be displayed in a graphical user interface, linked to the particular host or service. An administrator can use this information in connection with the patching specific systems or groups of systems.

In some cases, a discovered host can be actively scanned in order to refine the list of vulnerabilities for that host from a list of all possible vulnerabilities to a smaller set of core vulnerabilities. This elimination of vulnerabilities along with the lowering of the priority of vulnerabilities that have either already been patched on the target system or vulnerabilities that are not currently present due to the configuration of the service, allows the administrator to target efforts to resolve these vulnerabilities to identified problem areas.

The present invention permits the creation and modification of predefined and user-defined host attributes with predefined or user-defined values. It also provides the ability for the user to adjust these attribute values for any host manually. In some embodiments, the host attributes can be modified through a graphical user interface (GUI) provided through an application program interface (API). Through this interface, the user can have the ability to modify the network map and/or database through the graphical user interface. As non-limiting examples, the user can be provided with functions for (a) deletion of hosts and network subnets from the network map, (b) deletion of services from the network map, (c) marking of vulnerabilities as "not applicable," (d) modification of a criticality field for host entries, and (e) text annotation of hosts.

Selective Marking of Vulnerability Mappings as "Not Applicable"

Users can mark vulnerabilities as "Not Applicable" for a particular host. Vulnerabilities that are "Not Applicable" can be tagged with a database field in the network device database indicating that they are invalid (or not applicable) for the specific host or service. As a result, the "Not Applicable" vulnerabilities can be displayed in a separate list in the host profile and an impact flag can be set based on these vulnerabilities. After a vulnerability has been marked as "Not Applicable," the user can reactivate the vulnerability. Reactivation of a vulnerability unsets the database flag, causes the impact flag to use the vulnerability again, and causes display of the vulnerability in the "Valid" or "Applicable" vulnerabilities section in the user interface. An example user interface showing "Invalid" or "Not Applicable" vulnerabilities is shown in FIG. 12.

In some embodiments, a vulnerability marked as "Not Applicable" can lose status as "Not Applicable" on the occurrence of one or more predefined events. For example, if a change to an operating system or service on an entity occurs that causes a new vulnerability lookup to be performed, the vulnerability can be remapped to the entity as a "Valid" vulnerability, if applicable. If an operating system change event occurs, the previous vulnerability list can also be deleted and a new vulnerability lookup can be performed. If a vulnerability exists for an operating system and is marked as "Invalid" before an operating system change event, the vulnerability can be remapped as a "Valid" vulnerability.

Multiple Vulnerability Modification

In some embodiments, vulnerabilities can be marked as "Not Applicable" for several hosts with one user action. In such embodiments, multiple hosts or services mapped with a particular vulnerability are searched and identified and all of them are marked as "Not Applicable" without requiring the user to manually select each host or service.

User-Defined Attributes

Some embodiments of the invention can include an interface for creating one or more attributes in the host profile and assigning values or data types to the attribute. For example, attributes can include (a) an operational criticality attribute with values such as high, medium, or low, (b) a location attribute for storing exemplary values such as "Rockville," "Santa Clara," "London"; (c) an room number attribute for storing integer values type in a predefined range such as 0 to 600.

Attribute Types

One or more of the following types of attributes may be edited by a user through a graphical user interface.

Text Attribute Type

Figure 17:
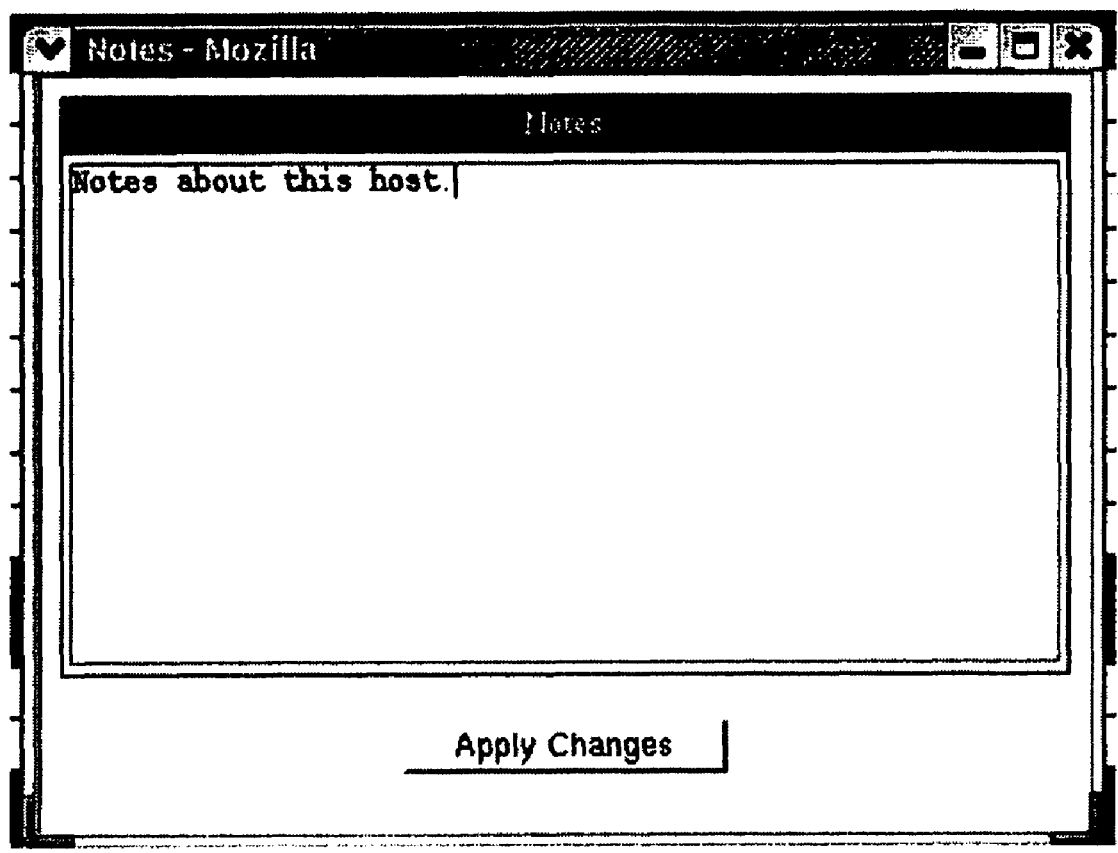
FIG. 17 illustrates an exemplary text or notes field.

This attribute type is a simple text field that can be appended to or included in the host profile. Removing special characters that may cause security issues from the attribute text value can be handled automatically. An exemplary text or notes field is shown in FIG. 17.

Integer Range Type

This attribute type is defined as an integer between a user defined minimum and maximum. If the user attempts to assign an integer to this attribute that falls outside the defined range, an error can be returned. If the attribute definition is modified, any host attribute setting that falls outside the defined range can be deleted.

Value List Type

This attribute type is defined as a list of string values. At least one value can be defined per list. Each entry can contain an ID that can be used to identify the attribute value when it is assigned to a host. If the attribute is modified and an item is deleted, any host attribute setting with this item value can also be deleted. For example, if a "Location" list attribute exists, and a system is assigned to the "Rockville" location, if the "Rockville" location is deleted, the Location attribute is deleted from all hosts with the "Rockville" value.

IP Assigned Value List Type

This attribute type is similar to the Value List Type, except that each list item can be associated with a list of network definitions (IP address/netmask pair in CIDR notation), and the value of the attribute for a host can be set automatically based on its IP address. If the value for a specific list item is modified, other hosts having that value set can be updated automatically.

The network definitions can be evaluated from most-specific to least-specific. For example, if the networks 10.4.0.0/16 and 10.0.0.0/8 are specified for different levels, the host 10.4.12.68 can be assigned the value matched with the 10.4.0.0/16 network. If the IP ranges for list items are modified, then the attribute value settings for the hosts can be automatically re-evaluated.

Host Criticality

A server criticality field can be provided for hosts in the network map. This field can be added in both the database and memory map representations of hosts and can be a searchable field. An exemplary interface for searching this attribute is shown in FIG. 13.

Figure 15:
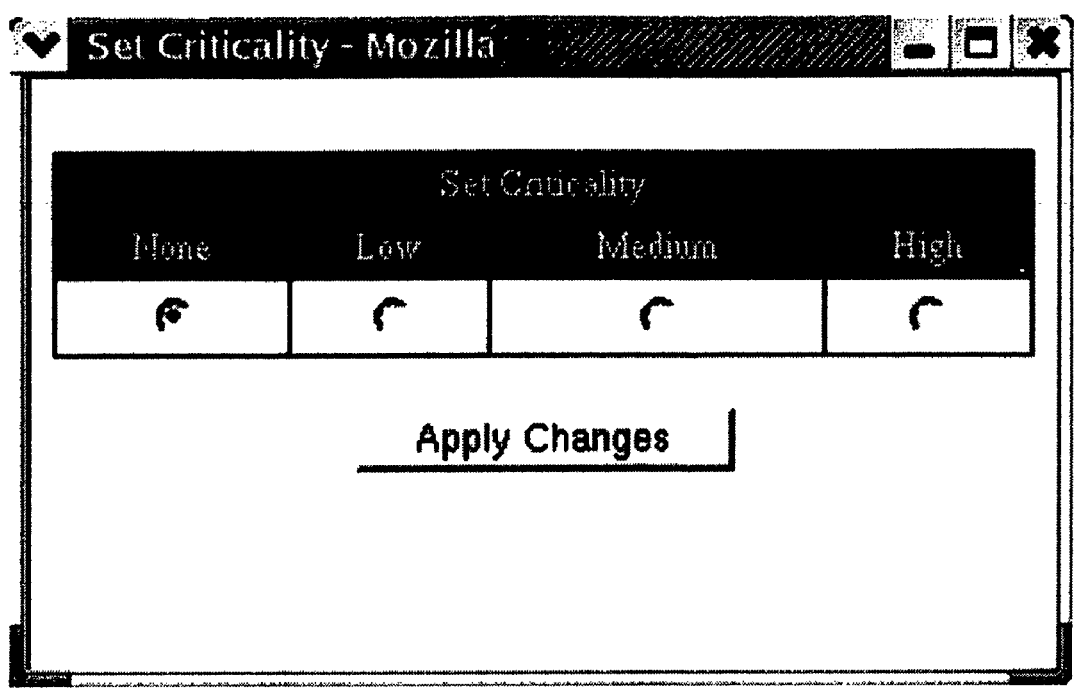
FIG. 15 illustrates an exemplary interface for selecting the criticality level for a host.

In one exemplary embodiment, the criticality category can contain four levels: none, low, medium, and high. The "none" level can be defined as the default level. When new hosts are added to the network map they can automatically be assigned this level. Users can change the level for individual hosts or apply a level change to selected hosts from the search results screen and/or the host view screen. Exemplary interfaces for setting the criticality field are shown in FIGS. 15 and 17. As discussed in more detail below, the criticality field can also be used in a rule associated with one or more policies and responses.

From the host map view, the criticality of a specific host may be selected by a user. According to the exemplary interface shown in FIG. 15, if the user clicks on a link, a pop-up can appear to allow the user to select the criticality level for the specific host.

Network Monitoring System Integration

Attribute definitions can contain Universal Unique Identifiers (UUIDs) to allow high availability peers and managed sensors to differentiate between locally and remotely generated attributes. As used herein, a high availability peer is a second system storing a second copy of a network map. In some embodiments, the network map stored for high availability can be synchronized between multiple peers hosting the map. Hosts assigned a value on one network monitoring system can be automatically assigned that value on a second high availability network monitoring system. In some embodiments, attributes that have been propagated to a second network entity can be modified on the second entity and propagated back to the first entity. Any of attributes and/or validity and applicability parameters described herein can be made available through high availability peers.

Users can be given the ability to define generic attributes that can be applied to all host profiles. The attributes can be usable in host searches and in connection with policies and responses. Features such as, but not limited to, adding, deleting and modifying attribute definitions, and setting and deleting attribute values for specific hosts can be performed through an API.

Policy and Response

When attributes are created, these values can be added to policy and response rules and search constraints. For the value list attribute type, users can be allowed to use the "is" and "is not" operators. For the integer range attribute type, users can be allowed to use mathematical operators such as =, <, and >. For text attributes, regular expression searches can be performed using operators such as "contains", "starts with", and "ends with."

In further embodiments, an interface can be provided so that a user can (a) assign attributes and values to hosts in the host profile, (b) assign attributes to one or more hosts in a host table view, (c) automatically assign and automatically set attribute values to a host based on an IP address and when the host is detected, (d) set predefined host attributes for use in a policy and response rule as a host qualifier, and (e) manage user defined host attributes.

Graphical User Interface

The graphical user interface can provide the user with a vulnerability editor to mark a specific vulnerability as "not applicable" for one or more hosts. In some embodiments, the interface can include a search screen that includes "vulnerability ID" as a searchable field to facilitate location of hosts with a selected vulnerability. Some embodiments can include a user interface to support user-defined host attributes. Through the interface, the user can perform one or more of the following functions: (a) creating and modifying attribute definitions, (b) viewing and modifying attribute settings for specific hosts, and (c) organizing host displays based on attribute values.

Existing Attribute List

The attribute list screen displays user-defined attributes. Initially, the list may be empty. Activation of a "create" link can display a separate screen for creating new attributes. For existing attributes, the table can display a name, type, and automatically assign a setting for attributes. The interface can include two links in each row for modifying and deleting specific attributes: an "edit" link can display an interface for editing entries and a "delete" link can delete selected items and refresh the table display. One such exemplary interface is shown in FIG. 3.

Add New Attribute

An add new attribute screen allows the user to name a new attribute, choose its type, and configure further settings based upon the type. As discussed above, exemplary types of attributes can include: text, integer, and list. In some embodiments, a limited set of the graphical user interface components for configuring the currently selected type are displayed. One such exemplary interface is shown in FIG. 4.

The integer range type interface can display two new rows containing the minimum and maximum input fields for the integer range. One such exemplary interface is shown in FIG. 5.

Figure 6:
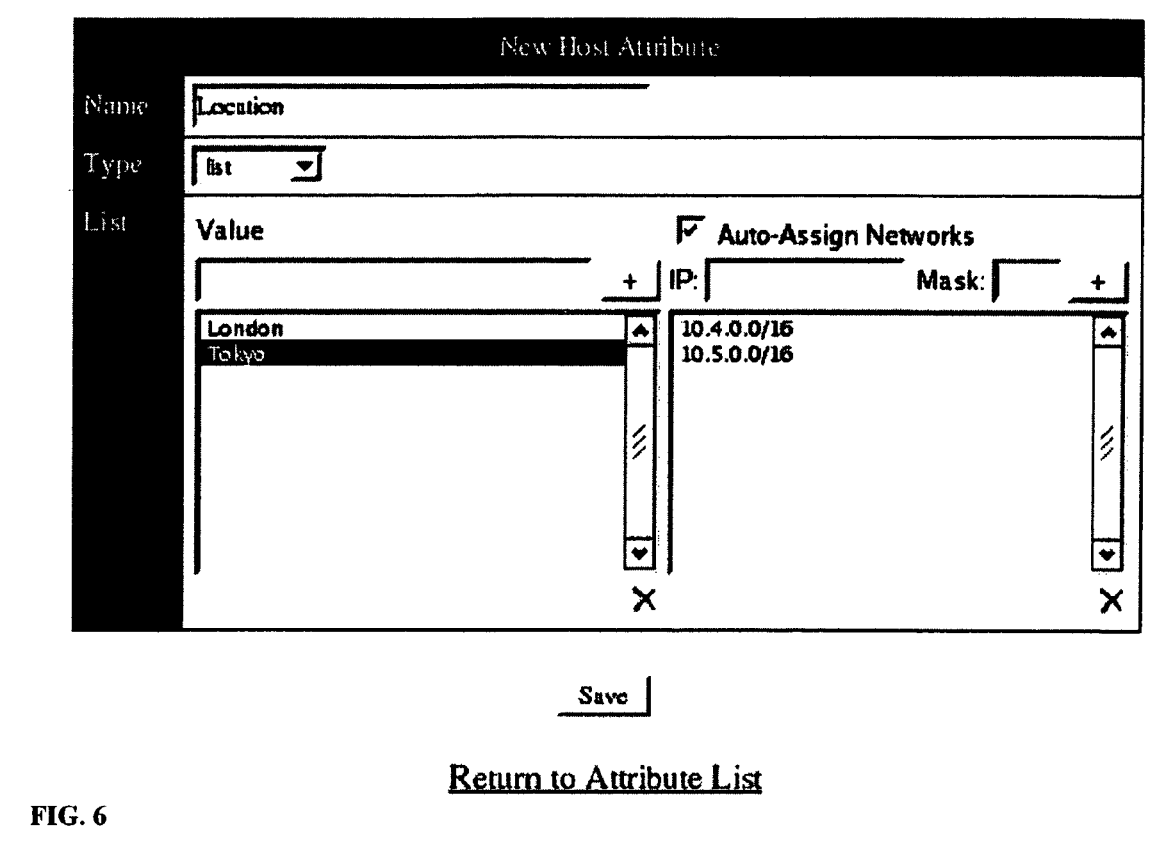

The list type can display two or more lists. One such exemplary interface is shown in FIG. 6. The first list is the list of values for the attribute. When one of these values is selected, the second list can display the IP ranges that are automatically assigned that value. Values can be added to either list using input fields. Selected items can be deleted using the "X" in the top-right of each list area. When the user is finished configuring the new attribute, the "Save Attribute" button can be used to add the attribute. The user can return to the attribute list later by activating a "Return to Attribute List" link or button.

Modify Existing Attribute

When the user clicks on the modify link for a specific attribute in the attribute list, an interface for modifying an existing attribute can be presented. One such exemplary interface is shown in FIG. 7. In some embodiments, a user is not permitted to change the type for an existing attribute. In such embodiments, the type is displayed as a label instead of a modifiable combination box. In some embodiments, controls employed in the new attribute interface can be used in the modify existing attribute interface.

Network Map View of Attributes

Figure 8:
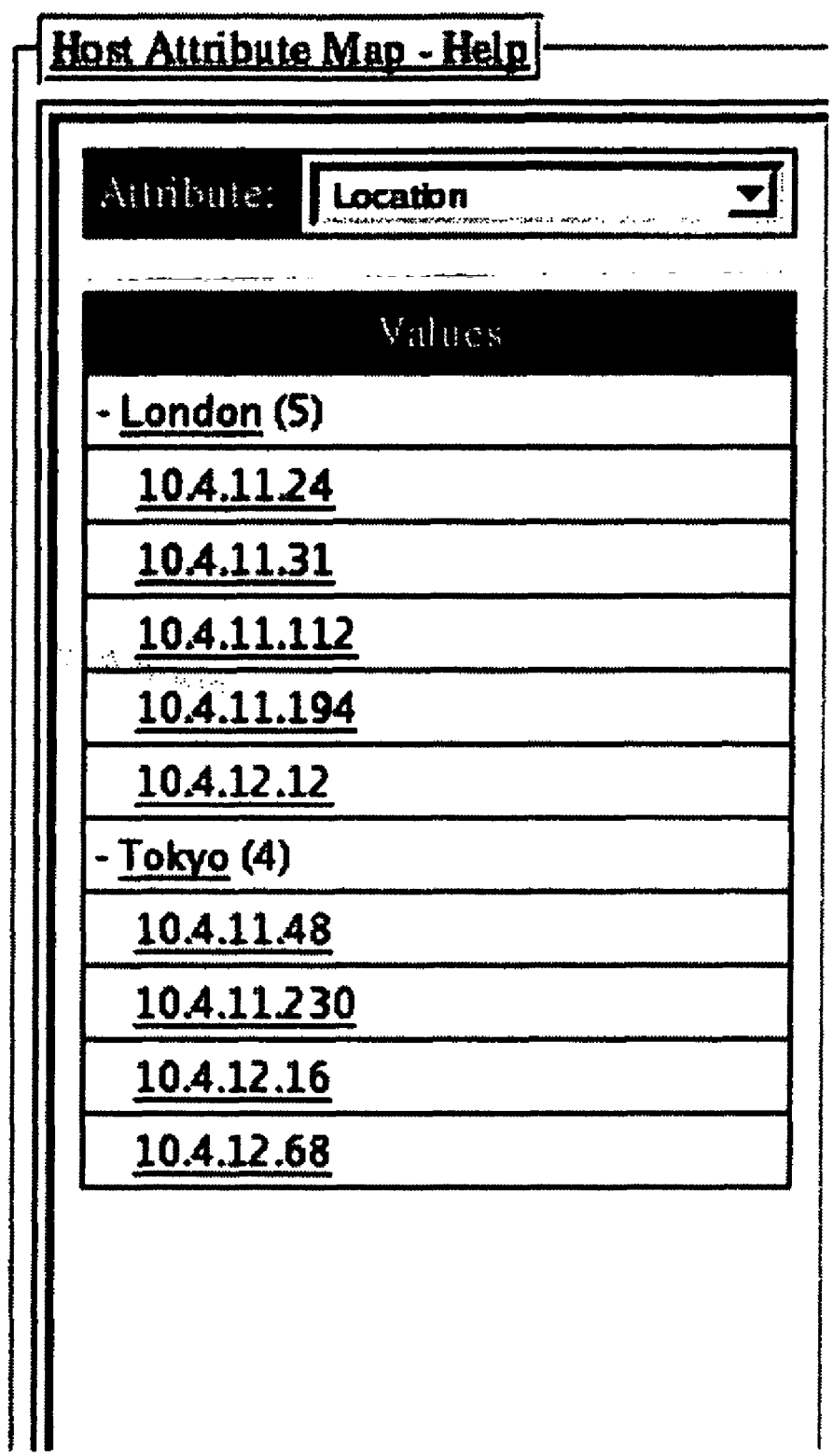
FIG. 8 illustrates an exemplary interface for selecting an attribute from a list of user-defined attributes.

The attribute view can allow the user to choose an attribute from a list of user-defined attributes. The values for the selected attribute can then be displayed as the top-level elements in the network map tree. When the user expands one of these values, a list of host IPs that have that attribute value set can be displayed as child elements. Selection of one of these hosts can cause display the host profile view in the right-hand panel. One such exemplary interface is shown in FIG. 8.

Attributes in the Host Profile

Host profile data can be viewed in any one of several graphical user interfaces. In some embodiments, editing of host attributes and vulnerabilities can be performed in separate popup windows. Attributes that have values set can also be displayed in a read-only host profile.

Collapsed Subsections

In some embodiments, displayed subsections, such as Services and Vulnerabilities can be expanded or collapsed. By default, they can be collapsed which can make the host profile less overwhelming and reduce its vertical size. The collapsed subsections can display a total element count in the title bar to inform user of the number of sub-elements without requiring expansion of each section. One such exemplary interface is shown in FIG. 9.

Attribute Editor

Figure 10:
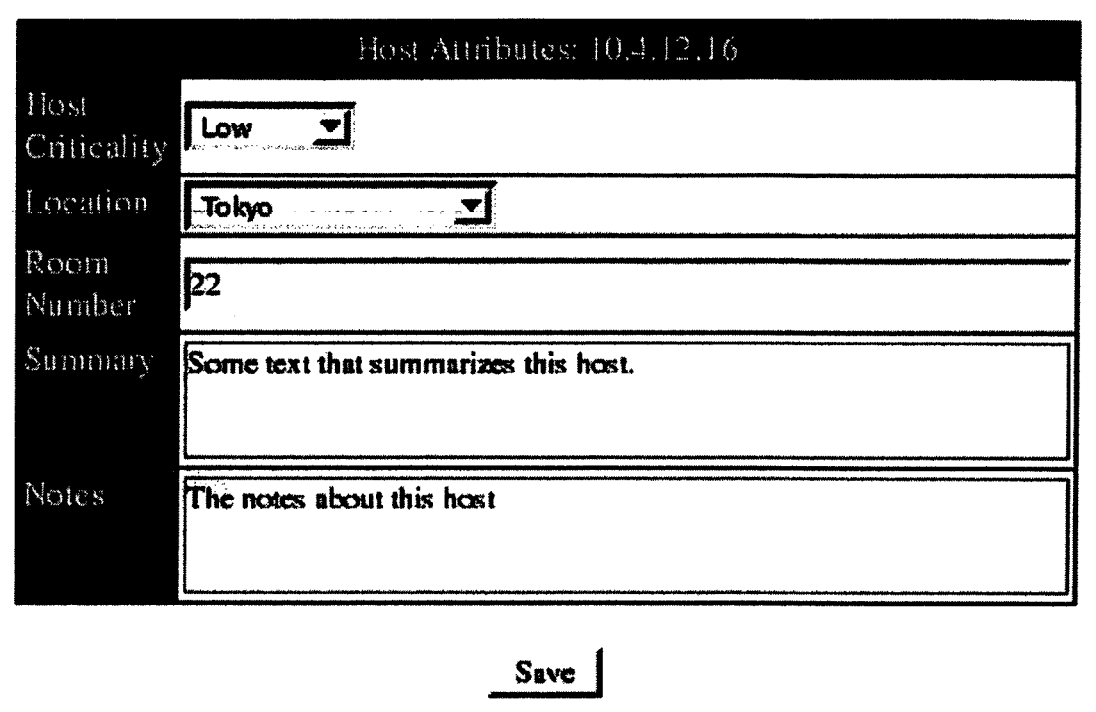

An attribute editor can be used to edit attributes in the table view. The editor can be a popup window that allows the user to select an available attribute and set its value for the selected host. The popup can include of a presentation of available attributes. Once an attribute is selected, an appropriate edit field for that attribute can be displayed. As non-limiting examples, the fields can include a text-area for text attributes, a text-field for range attributes, and a box for list attributes. One such exemplary interface is shown in FIG. 10.

Vulnerabilities Editor

Figure 11:
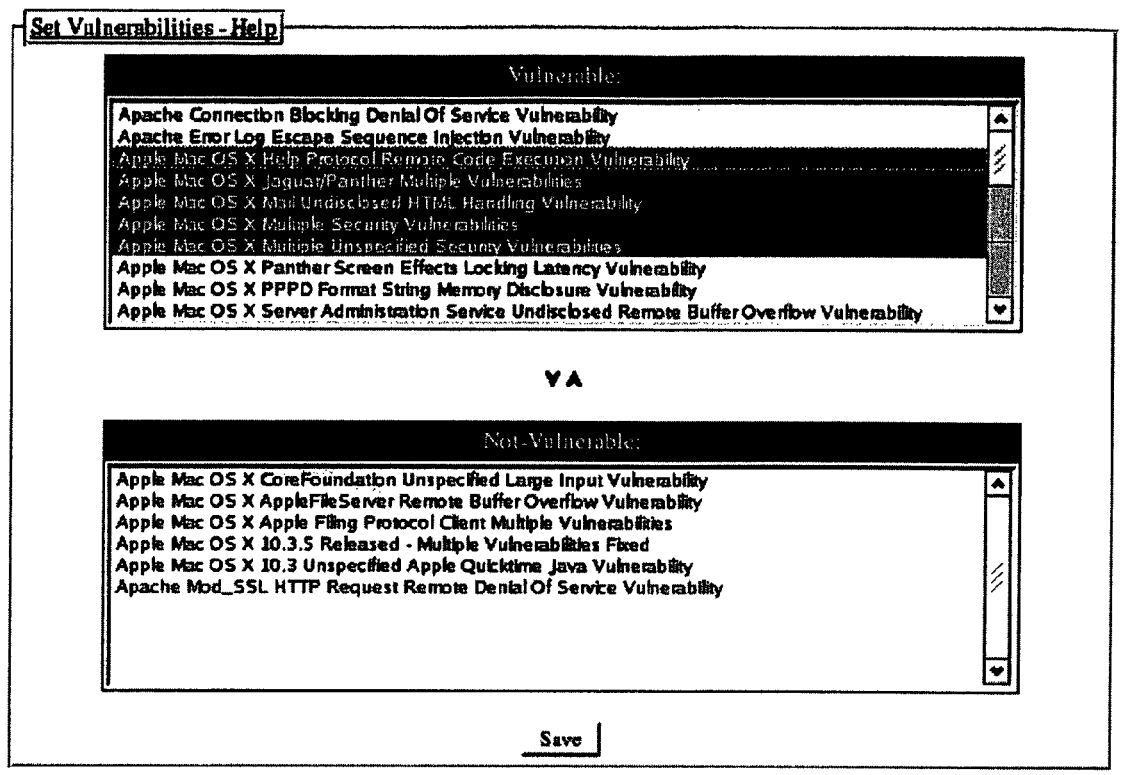
FIG. 11 illustrates an exemplary vulnerability editor.
Figure 14:
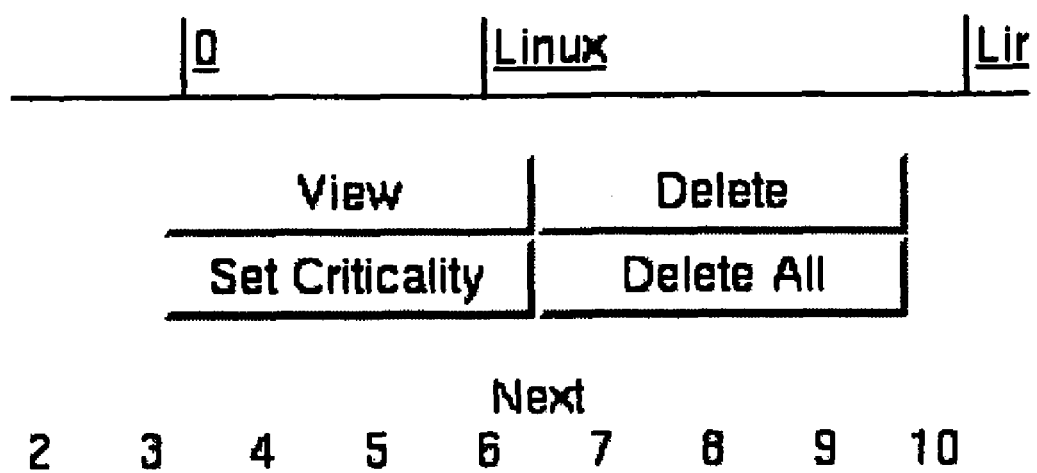
FIG. 14 illustrates an exemplary interface for setting a criticality field.

The vulnerability editor can allow users to easily designate the vulnerabilities that are, and are not, applicable to the current host. In one embodiment, the window can consist of two select lists, side by side, with arrow buttons between them. To transfer vulnerabilities from one list to the other, the user can select the desired items and click one of the arrow buttons. When the user is finished arranging the lists, the "Save" button can be used to apply the changes. One such exemplary interface is shown in FIG. 11.

Attribute Table View

An attribute table view can be used for searching, displaying, and reporting of attribute values and the hosts associated with those values. These attributes can be displayed in the host table view or in a separate table view. This table view can display columns for the attribute name, the IP address of hosts with attribute settings, and the value of those attributes.

A corresponding attribute search page can be provided for searching the attribute table view based on attribute name, value, and/or host IP address. Link buttons from the attribute table view to other table views can also be used for locating other information associated with a set of selected attributes.

In some embodiments, a "Set Attributes" button can be included in the interface. Selection of this button can cause display a popup window that allows the user to select an available attribute and set its value for hosts identified in the table view. The popup can include a combo-box of available attributes, and once an attribute is selected, an appropriate edit field for that attribute can be displayed such as a text-area for text attributes, a text-field for range attributes, or a combo-box for list attributes.

In accordance with an embodiment of the present invention, instructions adapted to be executed by a processor to perform a method are stored on a computer readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the claims, and by their equivalents.

The invention claimed is:

1. A method for assigning a vulnerability parameter to a device on a network, comprising:

passively determining, responsive to a passively read packet, a vulnerability parameter for an operating system or service;

storing, responsive to the vulnerability parameter being passively determined, the vulnerability parameter in a host map associated with a network device;

providing a graphical user interface for viewing and modifying the vulnerability parameter which was passively determined; and storing the modified vulnerability parameter in the host map, wherein the vulnerability parameter is invalid or valid, when the vulnerability parameter is invalid and a pre-defined change in the operating system or service occurs on the network device, a vulnerability lookup is performed for the changed operating system or service and the vulnerability parameter is mapped from invalid to valid based on the vulnerability lookup for the changed operating system or service, wherein the vulnerability parameter is associated with a universal unique identifier to distinguish between locally and remotely generated vulnerability parameters and is synchronized to a high availability peer, the vulnerability parameter being propagated from the host map to the high availability peer, when the vulnerability parameter is modified at the high availability peer, the modified vulnerability parameter is propagated from the high availability peer back to the host map.

2. The method of claim 1, wherein the graphical user interface is provided through an application program interface.

3. The method of claim 1, wherein the graphical user interface provides a function for setting the vulnerability parameter for a plurality of selected hosts or services.

4. The method of claim 1, wherein the graphical user interface provides a function for deleting a host from a network map.

5. A method for assigning a vulnerability parameter to a device on a network, comprising:
   passively determining, responsive to a passively read packet, a vulnerability parameter for an operating system or service;
   storing, responsive to the vulnerability parameter being passively determined, the vulnerability parameter in a host map associated with a network device;
   providing a graphical user interface for viewing and modifying the vulnerability parameter which was passively determined; and
   storing the modified vulnerability parameter in the host map, wherein
   the vulnerability parameter is associated with a universal unique identifier to distinguish between locally and remotely generated vulnerability parameters and is synchronized to a high availability peer, the vulnerability parameter being propagated from the host map to the high availability peer,
   when the vulnerability parameter is modified at the high availability peer, the modified vulnerability parameter is propagated from the high availability peer back to the host map.

6. A system for assigning a vulnerability parameter to a device on a network, comprising:
   a computer-readable medium for storing, responsive to a vulnerability parameter for an operating system or service being passively determined, the vulnerability parameter for the operating system or service in a host map associated with a network device;
   a display configured to display a graphical user interface for viewing and modifying the vulnerability parameter which was passively determined, the vulnerability parameter being assigned to the service or operating system; and
   a computer-readable medium for storing the modified vulnerability parameter in the host map, wherein
   the vulnerability parameter is invalid or valid,
   when the vulnerability parameter is invalid and a pre-defined change in the operating system or service occurs on the network device, a vulnerability lookup is performed for the changed operating system or service and the vulnerability parameter is mapped from invalid to valid based on the vulnerability lookup for the changed operating system or service,
   wherein
   the vulnerability parameter is associated with a universal unique identifier to distinguish between locally and remotely generated vulnerability parameters and is synchronized to a high availability peer, the vulnerability parameter being propagated from the host map to the high availability peer,
   when the vulnerability parameter is modified at the high availability peer, the modified vulnerability parameter is propagated from the high availability peer back to the host map.

7. A system for assigning a vulnerability parameter to a device on a network, comprising:
   a computer-readable medium for storing, responsive to a vulnerability parameter for an operating system or service being passively determined, the vulnerability parameter for the operating system or service in a host map associated with a network device;
   a display configured to display a graphical user interface for viewing and modifying the vulnerability parameter which was passively determined, the vulnerability parameter being assigned to the service or operating system; and
   a computer-readable medium for storing the modified vulnerability parameter in the host map, wherein
   the vulnerability parameter is associated with a universal unique identifier to distinguish between locally and remotely generated vulnerability parameters and is synchronized to a high availability peer, the vulnerability parameter being propagated from the host map to the high availability peer,
   when the vulnerability parameter is modified at the high availability peer, the modified vulnerability parameter is propagated from the high availability peer back to the host map.

* * * * *